US010986965B1

(12) United States Patent
Burns

(10) Patent No.: US 10,986,965 B1
(45) Date of Patent: Apr. 27, 2021

(54) ATMOSPHERIC VEGETABLE DISH

(71) Applicant: Duncan Burns, Santa Monica, CA (US)

(72) Inventor: Duncan Burns, Santa Monica, CA (US)

(73) Assignee: Veggidome SPC, Santa Monica, CA (US)

(*) Notice: Subject to any disclaimer, the term of this patent is extended or adjusted under 35 U.S.C. 154(b) by 0 days.

(21) Appl. No.: 15/064,796

(22) Filed: Mar. 9, 2016

(51) Int. Cl.
A47J 47/10 (2006.01)
B65D 81/18 (2006.01)
A47G 19/26 (2006.01)
A47G 21/00 (2006.01)
A47G 23/04 (2006.01)
A47G 23/06 (2006.01)

(52) U.S. Cl.
CPC .............. A47J 47/10 (2013.01); A47G 19/26 (2013.01); B65D 81/18 (2013.01); A47G 21/007 (2013.01); A47G 23/04 (2013.01); A47G 23/0683 (2013.01); A47G 2023/0691 (2013.01); B65D 2543/00351 (2013.01)

(58) Field of Classification Search
CPC ....... A47J 47/10; A47G 19/26; A47G 21/007; A47G 23/04; A47G 2023/0691; A47G 23/0683; A47F 2010/065; A47F 10/06; A47F 3/145; B65D 81/18; B65D 2543/00351; B65D 85/76
USPC .......................................... 220/574; 312/284
See application file for complete search history.

(56) References Cited

U.S. PATENT DOCUMENTS

| 519,417 | A | * | 5/1894 | York | A47G 19/26 312/284 |
| 877,796 | A | * | 1/1908 | Olson | A47G 19/26 312/284 |
| 1,929,139 | A | * | 10/1933 | Eisenhauer | A47G 19/26 312/137 |
| 1,973,449 | A | * | 9/1934 | Tighe, Jr. | A47G 19/26 220/200 |
| 2,419,299 | A | * | 4/1947 | Tanner | A01J 25/004 108/44 |
| 3,330,610 | A | * | 7/1967 | Schnabel | A47G 19/26 220/293 |
| 3,470,944 | A | * | 10/1969 | Segal | A47G 19/26 126/246 |
| 3,511,288 | A | * | 5/1970 | Swett | A47F 3/145 206/45.2 |
| 3,529,531 | A | * | 9/1970 | Swett | A47G 19/30 206/525 |
| 4,832,225 | A | * | 5/1989 | Benjamin | A47J 36/06 220/254.1 |
| 4,921,114 | A | * | 5/1990 | Rome | A47G 19/30 220/212 |

(Continued)

Primary Examiner — James N Smalley
Assistant Examiner — Jennifer Castriotta
(74) Attorney, Agent, or Firm — Stefan J. Kirchanski; Matthew J. Spark; Zuber Lawler LLP

(57) ABSTRACT

An improved dish for displaying and storing vegetables at room temperature. A transparent dome component rests on a planar base. An opening in the apex of the dome components allows vegetable to be readily placed and removed from the dish. The opening is closed by a loose-fitting lid so that sufficient humidity is maintained to keep the stored vegetables from becoming flaccid. Yet sufficient air exchange is allowed by the edges of the lid to retard senescent and spoiling of the vegetables.

9 Claims, 4 Drawing Sheets

(56) References Cited

U.S. PATENT DOCUMENTS

| | | | | |
|---|---|---|---|---|
| 5,045,331 A | * | 9/1991 | Antoon, Jr. | A23B 7/148 |
| | | | | 426/106 |
| 2005/0000963 A1 | * | 1/2005 | Cautereels | A47G 19/26 |
| | | | | 220/254.1 |
| 2009/0101535 A1 | * | 4/2009 | Hsieh | B65D 81/2038 |
| | | | | 206/524.8 |
| 2010/0127010 A1 | * | 5/2010 | Short | B65D 21/0219 |
| | | | | 220/781 |
| 2013/0248402 A1 | * | 9/2013 | Donnelly | A47G 19/26 |
| | | | | 206/457 |

* cited by examiner

ATMOSPHERIC VEGETABLE DISH

CROSS-REFERENCE TO PRIOR APPLICATIONS

Not Applicable

U.S. GOVERNMENT SUPPORT

Not Applicable

BACKGROUND

Area of the Art

The present invention relates to the art of food storage containers and more specifically to a dish designed to keep vegetables fresh at room temperatures.

Description of the Background

It is currently understood that the human diet contributes significantly to overall health and well-being. At one time it was thought that all that was necessary was to provide sufficient food to avoid starvation. However, it gradually became apparent that certain foods were essential to avoid specific diseases. In this way vitamins were discovered. Vitamins were found to be specific organic molecules that are required for essential cellular biochemical processes. Without an external source of these factors poor health and even death ensued.

Although the exact number of essential vitamins was and is somewhat in dispute, the general theory developed that as long as foods supplied sufficient proteins, carbohydrates and, to a lesser extent, lipids, human health would be ensured provided sufficient vitamins were added to the food or were available from an external source. This theory laid the groundwork for processed or "factory" foods. Raw materials were refined into proteins, carbohydrates and lipids which were configured along with vitamins into tasty, convenient and inexpensive food products. This was expected to result in optimal human nutrition at the lowest possible costs. Instead the result has been an epidemic of obesity and other metabolic diseases. It is now apparent that this is affecting overall life span with a growing division between the economically disadvantage who rely on processed foods and those who can afford to consume the more expensive fresh foods.

People have long been told to consume fresh fruits and fresh vegetables. It was thought that these foods contain elusive vitamin-like factors not otherwise obtainable. While this is probably true, we now know that consumption of fresh fruits and fresh vegetables controls and alters the human microbiome. The microbiome is the huge number of microorganisms that inhabit the human gut. Collectively, these microbes contain more genetic diversity than the entire human genome. Over billions of years animals have evolved in concert with their microbes and are absolutely dependent on the microbes for proper development and health. The wrong foods, while seemingly providing all essential nutrients, will encourage the wrong microorganisms which result in obesity and any number of disease states. So optimal human health depends on proper nutrition of the entire system, that is the human animal and its microbes.

Consumption of fresh fruits and fresh vegetable encourages the proper microbiome and may go a long way to combatting the maladies caused by a diet rich in processed foods, but how to increase consumption of these items? Actually, fruits do not pose as much of a problem because they are sweet, brightly colored and attractive to most consumers. A fruit bowl is a common item, and many fruits are stable for at least a couple of days at room temperature. While it may be necessary to store a backup supply of fruit in the refrigerator, an adequate supply of fruits can be displayed on the kitchen table or counter to encourage healthy snacking. Unfortunately, vegetables are not so simple. While most vegetables store well in a humidified refrigerator compartment, they generally do not do well at room temperature. If vegetables are simply left out on the table, they rapidly wilt and become unappetizing. If the vegetables are enclosed in a plastic bag, wilting will be delayed, but bacteria and fungi rapidly grow in the excessively moist atmosphere, rapidly reducing the vegetables to a slimy mess. It is possible to place the vegetables into a sealed rigid container to avoid the problems caused by excess moisture, but the vegetables continue to respire and in many cases begin to undergo accelerated senescence becoming yellow and necrotic (spoiled). Yet, if the vegetables remain safely stored in the refrigerator, it is highly unlikely that anyone will consider snacking on them—sort of an out of sight, out of mind situation.

SUMMARY OF THE INVENTION

The inventive atmospheric dish set is comprised of (1) a substantially planar, large platter with rivulets in the center surface, (2) a dome-like chamber that is open on the bottom and the top (it has an opening in its crown,) and (3) a lid that sits on the top of the center chamber, covering the hole but not tightly sealing it. The combination of these three elements ensures that fresh vegetables placed inside the unit will retain moisture and freshness outside a refrigerator for several days. Water vapor from the natural transpiration of the plants remains within the chamber and helps the plant tissue remain turgid, whereas ethylene gas, a ripening hormone which is also emitted by the plants, escapes through the juncture between the lid and the chamber and hence, does not stimulate the stored vegetables to spoil or age quickly.

DETAILED DESCRIPTION OF THE INVENTION

Figure 1:
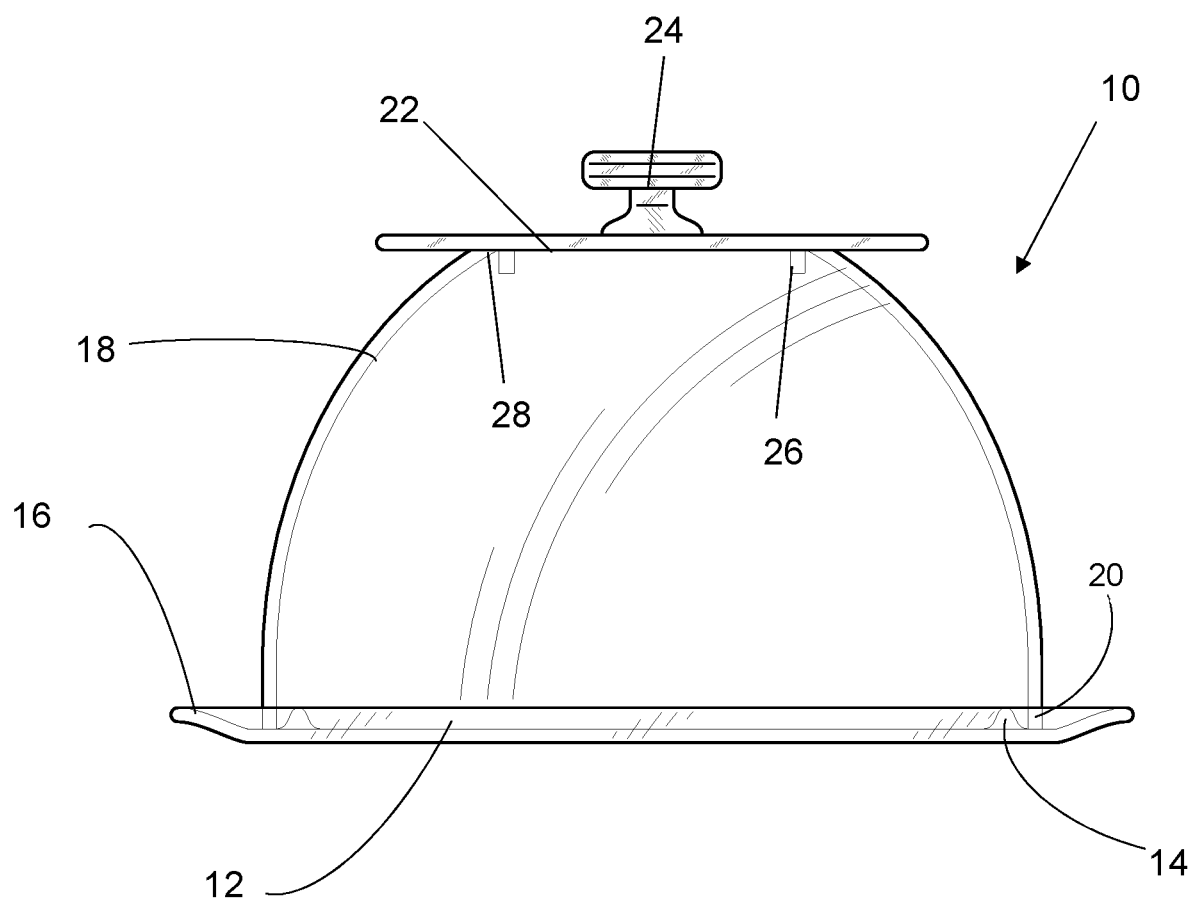
FIG. 1 is a side view of the invention.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an atmospheric dome ideal for short-term, room temperature storage and display of vegetables.

A storage dish intended to display fresh vegetable to encourage their consumption needs to maintain adequate humidity, sufficient to prevent wilting but not so wet so as to encourage growth of bacteria and fungi. The dish should also be either transparent or contain a transparent window so as to show the vegetables to promote their consumption. In addition, many parts of green plants senesce more rapidly in the dark than in light so that exposure to light may actually extend the useful life of the vegetables. The preferred structure is related to structures used in storage and display of other food items. The device has a more or less planar base similar in structure to an ordinary dish. The vegetables to be stored are arranged on the planar base. While it is possible to place one or a few vegetables on the base, it is more efficient and attractive to create a pile of vegetables.

It is desirable to keep the humidity within the device high without having water actually contacting the vegetables. For this purpose, the planar base may be formed with a pattern of ridges or the like so that water can accumulate on the base while the ridges or "rivulets" keep the vegetable out of contact with the water. Alternatively, a perforated insert of inert material can be placed on the planar base but spaced slightly away from the base so that the vegetables contact the insert and not water that may accumulate below the insert.

Vegetables placed on the planar base are protected by a transparent dome not entirely unlike a cheese dome. Generally, a cheese dome seals against a slab on which the cheese is placed, although the dome can also be designed to seal by fitting into a groove on a base dish. The transparent dome of the present invention is preferably formed so that the lower edge of the dome fits into a groove or indentation in the planar base. Alternately, the lower edges of the dome could be ground flat to seal against a slab-like planar base. The precise shape of the dome does not appear to be critical. A rounded dome is typical, but a "dome" formed as a truncated cone is also acceptable. The word "dome" implies a circular cross-section, but the invention operates with an oval or elliptical dome (with a matching oval planar base). Similarly, the "dome" can be square (see, FIG. 3) or rectangular in cross-section so that the "dome" is actually a pyramidal frustum. In such embodiments, the planar base could be a matching square or rectangle and could have grooves or indentations to accept and seal with the lower surfaces of the frustum.

Unlike a cheese dome, the dome of the current invention is open at the apex or crown of the dome as well as at the base of the dome. This opening is shaped according to the form of the dome. That is, a circular dome will have a circular opening and an oval dome an oval opening, etc. The opening is for placing vegetables into the dish for storage and for removing them from the dish for consuming them. In the case of the cheese dome, it is relatively easy to place a piece of cheese at the center of the dish and lower the dome over it. However, when placing a quantity of loose vegetables on the dish, it can be somewhat difficult to avoid having part of a vegetable extend too far so as to be pinched between the dish and the dome when the dome is lowered into place. This problem is exacerbated when a relatively large pile of vegetables is placed on the dish. Even if the vegetables are successfully arranged to allow lowering of the dome, each time the dome is lifted to retrieve a vegetable, the pile may shift so that replacing the dome is difficult. This problem is avoided by inserting and removing vegetables through the opening in the dome. Normally, the dome is removed from the planar base only for cleaning or storage purposes.

Finally, the invention has a lid for closing the opening. The lid is sized to fit over the opening and slightly overlap it. The opening may have a short upward extending flange that extends into the lid to locate and stabilize it; alternatively, the lid may have a flange that extends downward into the opening to locate and stabilize the lid. The lid may also be equipped with a handle or knob to facilitate removing and placing the lid. The lid sits over the opening but does not tightly seal it. The lid is shaped to fit the opening (circular, oval, square or rectangular). The lid can be flat or can itself be slightly domed to match the shape of the dome itself. A small amount of gas exchange occurs at the edges of the lid, sufficient to allow escape of ethylene gas but not large enough to allow rapid dehydration of the vegetables.

The dome and the lid are preferably made of a transparent material. The planar base can be made from a matching material or can be opaque. Either transparent plastic or glass can be used. Plastic is lighter and more durable but is, perhaps, a bit harder to keep clean and is more prone to becoming scratched. In addition, some consumers do not like to use plastic with foods because of the problems with leaching plasticizers and other chemicals typically found in plastics. The dimensions are scaled depending on the size of the planar base. For a base about 12 inches in diameter, the dome would be about 6-8 inches in height and the opening in the top of the dome would be about 6-8 inches in diameter.

Figure 2:
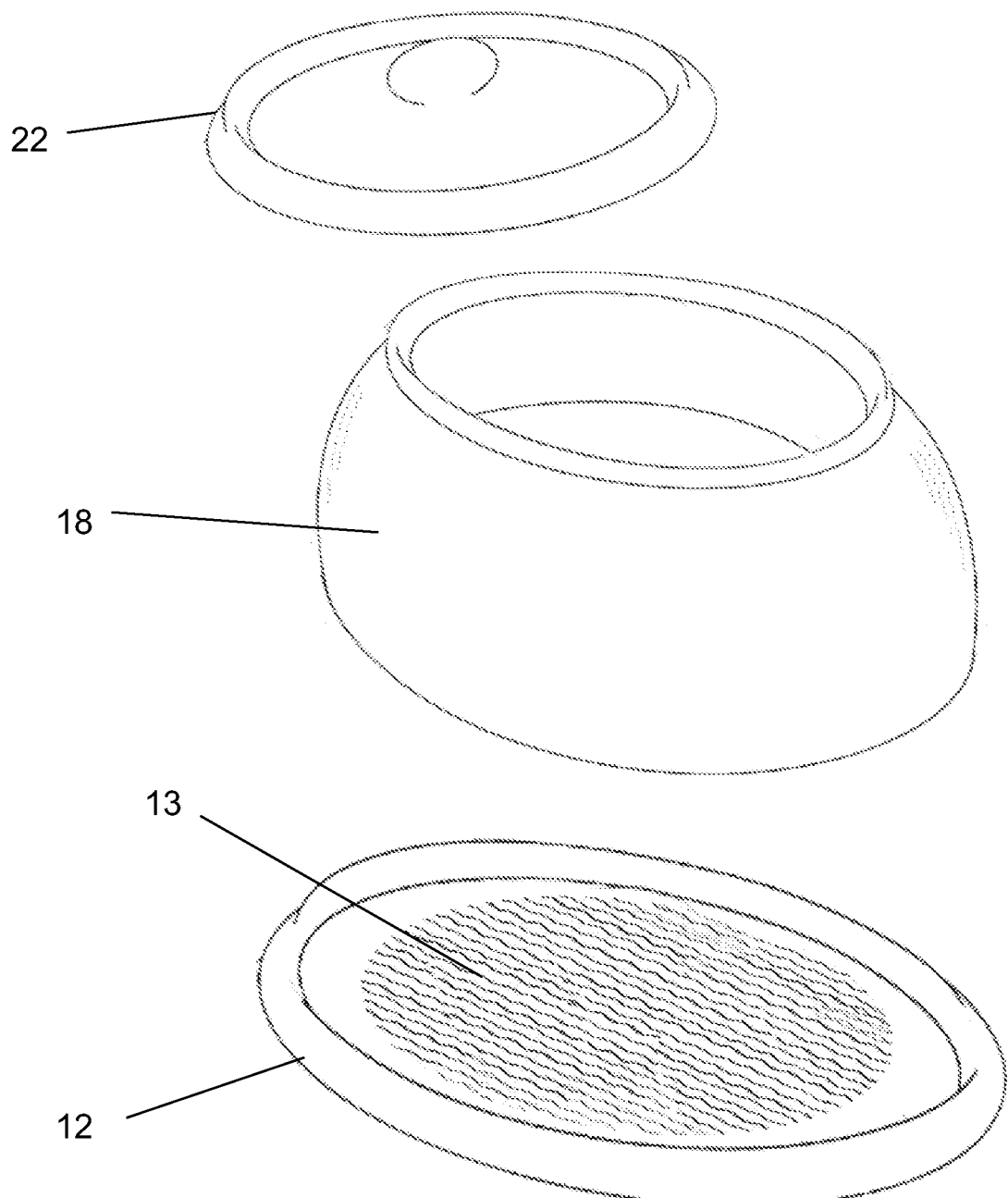
FIG. 2 is a drawing of the embodiment having an elliptical cross-section and showing the lid and dome and base separated from each other.
Figure 3:
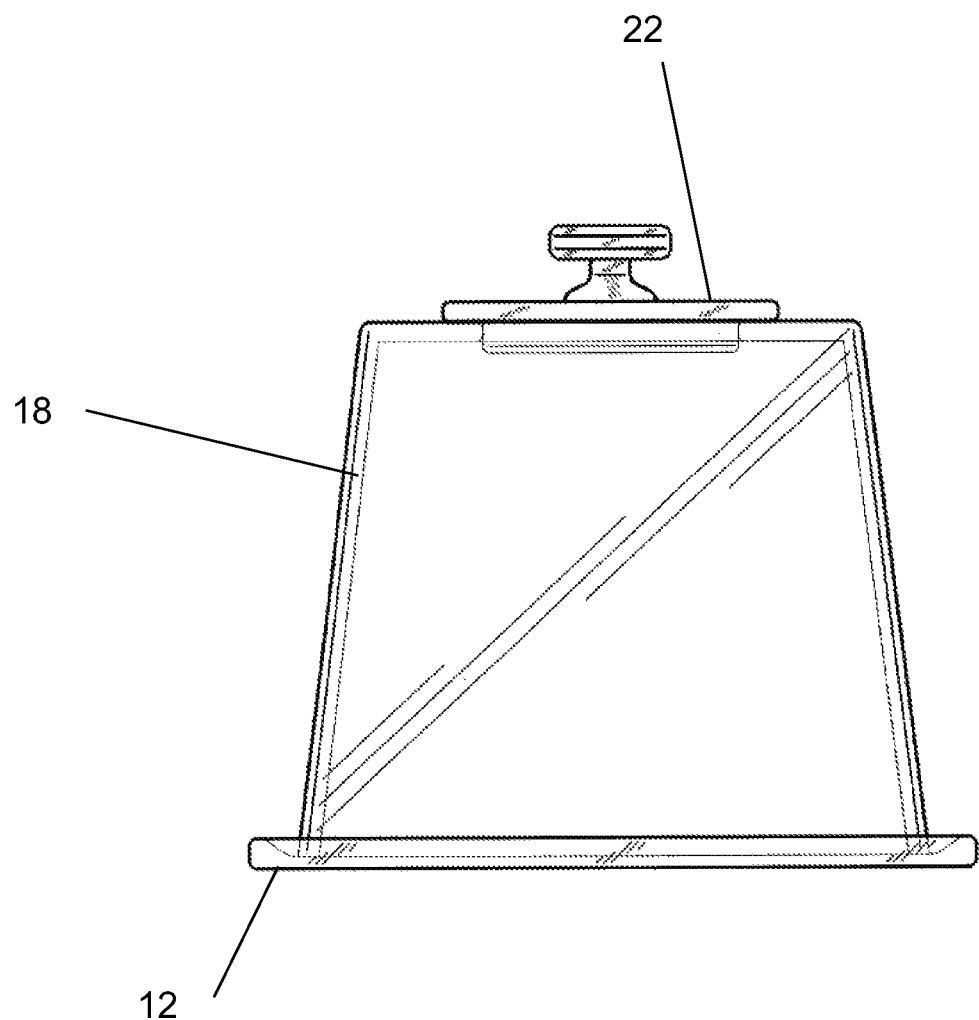
FIG. 3 is a square embodiment of the invention.

FIG. 1 shows a side view of an embodiment of an atmospheric dish 10 which consists of a planar base 12 which has a peripheral ridge 14 and an upturned outer edge 16. The lower edge 20 of the circular dome 18 interacts sealingly with the ridge 14 so as to be located between the ridge 14 and the upturned edge 16. In addition, the ridge 14 and the upturned edge 16 prevent the escape of any liquid that accumulates on the bottom of the planar base 12. The lid 22 in this embodiment is flat with an overlapping edge 28. The lid 22 has a downwardly extending flange 26 that interacts with edges of the top opening in the dome 18 and a knob 24. FIG. 2 shows a perspective view of an alternate embodiment of the device where the dome is elliptical (oval) in cross-section and in which the lid and dome are separated from each other and from the planar base. Note the ridges 13 in the base designed to prevent contact of the vegetables with any standing water pooled onto the base. In the embodiment of FIG. 2, the opening in the dome has a short upward extending flange that extends into the lid to stabilize and locate it without providing a gas-tight seal. FIG. 3 shows an embodiment in which the "dome" is square in cross-section and the lid has a downward extending flange similar to the embodiment of FIG. 1.

An experimental test was made comparing a prototype device with a standard dome (glass bowl) in terms of preserving vegetable at room temperature. As a comparative control similar vegetables were placed in a sealed plastic bag in the crisper of a refrigerator. For the test the following vegetables were cleaned by rinsing with cold tap water in a colander: lettuce, baby bok choi, green beans, sugar snap peas, tomatoes, mushrooms, sunflower sprouts, celery stalks, kale leaves and carrots.

Both the prototype unit and the glass bowl were placed on a dish to serve as a base. The units were loaded with a the above-listed vegetables. While it was easy to load the prototype unit, it was found that lifting the glass bowl to insert vegetables often resulted in vegetables scattering and falling at least partially off the base (dish). Of course, this problem can be reduced by placing only a limited number of vegetables under the glass bowl, but that rather defeats the goal of displaying a good range of vegetables.

Once the units were loaded, the experiment went on for five days. The weather was relatively warm so that the ambient temperature was somewhat above normal—particularly during the daytime so that the average daytime inside temperature was 84° F. while the average inside night temperature was about 58°.

Because of the problems of vegetables falling out when the glass bowl was opened, that unit generally remained closed. The prototype unit was briefly opened on days 1, 2, 5 and 6 to remove vegetables. At the end of the test period, the following observations were made:

Vegetables in the Prototype Unit. These vegetables showed some damage; the tomato was very ripe, but not spoiled; the sugar snap peas were completely green and undamaged. The green beans were aged and inedible (tough and senescent), but not rotten, and the mushroom was aged but not spoiled. The carrots were mostly undamaged, with root tips, slightly brown. The lettuce stem had ends that were brown, yet the leaf was green and alive. The kale leaf had aged with portions of the leaf yellowed. The celery and sunflower sprouts had brown portions near their ends or where breakage had occurred, but a majority of the tissue was unblemished. One celery stalk had brown discoloration in the center for approx. 30% of the length. Considering the high ambient temperatures, it seemed surprising that the vegetables has survived as well as they had.

Vegetables in the Bowl Unit. These vegetables were generally ruined; mold had grown on the tomato, which had rotted on one side, and the sugar snap peas had liquefied. The green beans were rotten, and the mushrooms were slimy. Carrots were mostly undamaged, but abrasions or patches of damage on the exterior sides were apparent. The lettuce stem had turned brown, yet the green leaf was still alive. The kale leaf had turned yellow and brown with age and had also rotten portions on the edges. The celery and sunflower sprouts had brown portions near their ends or where breakage had occurred, but a majority of the tissue was unblemished. Generally, there was much more damage to these vegetable than to their compatriots in the prototype unit. Because the prototype unit was opened more often (albeit only briefly), it is possible that there was less water in the prototype than in the bowl unit. However, the amount of open time did not seem sufficient to account for the different results.

Vegetables in the Plastic Bag. The "control" vegetable in the refrigerator showed only limited damage. The lettuce showed brown spoilage in the stem, the green leaf was still alive, had occasional spots of rot on the edges. The kale was aged, had areas of yellow-green and sections that were rotten along the edge of the leaf. The carrot was undamaged; it had a slightly brown root tip. While these vegetables were in somewhat better shape than those in the prototype unit, they were more similar to the prototype unit vegetables than to the glass bowl vegetables.

Figure 4:
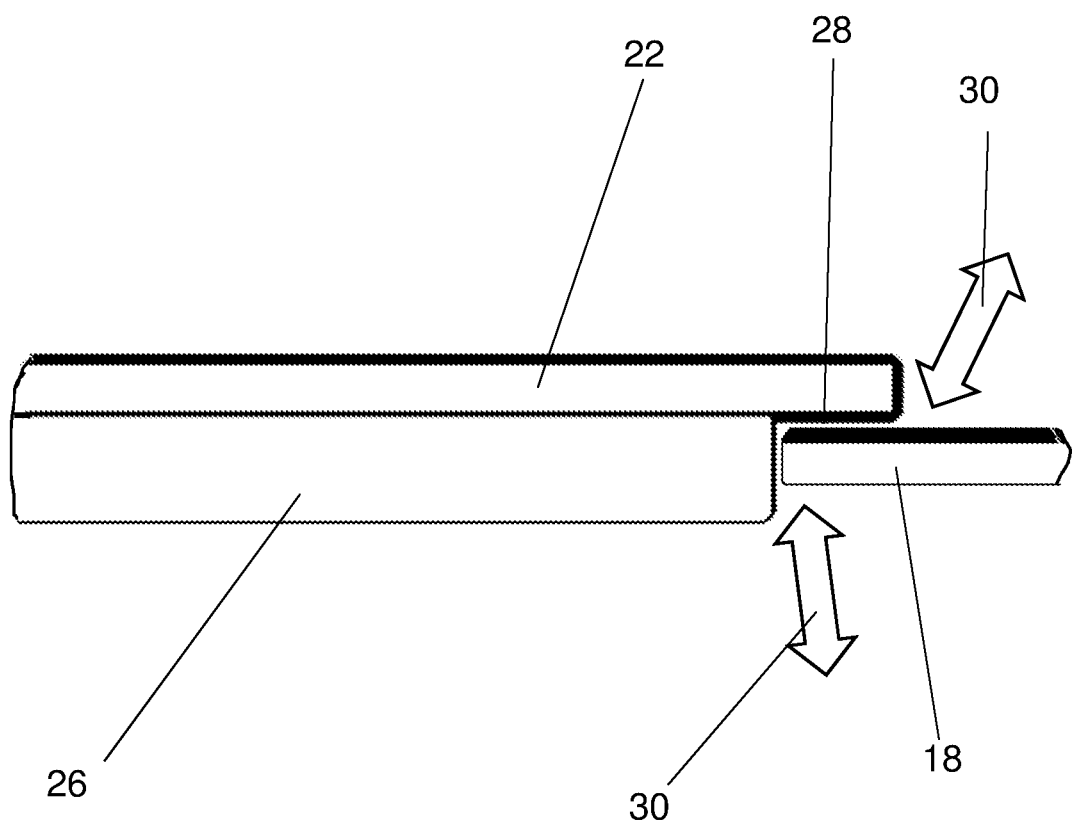
FIG. 4 is magnified cross-section of a portion of FIG. 3 showing lid overlap.

The prototype unit was much easier to load and utilize than the glass bowl (essentially structurally equivalent to a cheese dome). There was a surprising difference in the amount of damage to the vegetables in the prototype unit as compared to the inverted glass bowl. It would appear that the limited amount of air exchange occurring at the edges of the loose-fitting lid is sufficient to make a considerable difference. Because the vegetable in the prototype unit did not appear wilted (in spite of the relatively high ambient temperatures during the test), it seems as if loss of water vapor is not the explanation for the different results. Perhaps exchange of oxygen and carbon dioxide are important. It is also possible that the relatively small amount of gas exchange that takes place at the edges of the lid lowers the concentrations of ethylene which is emitted by the vegetable and stimulates senescence. FIG. 4 shows a closeup view of the overlapping edges 28 of the bowl and the lid with the arrows 30 illustrating gas exchange. In any case, the removable lid not only greatly improves the utility of the device, it appears to contribute to preservation of the vegetables.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A dish for displaying and preserving vegetables at room temperature comprising:
   a planar base;
   a transparent cover portion having a lower edge opening disposed sealingly on said base and an opening, surrounded by an upper edge, in an upper portion of said cover portion, said opening being smaller than said lower edge opening to allow removal of vegetables placed on said planar base without removing said transparent cover from said planar base; and
   a lid closing said opening by overlapping the upper edge without providing an airtight seal so that a small amount of gas exchange occurs between the lid and the upper edge whereby the vegetables are preserved at room temperature.

2. The dish according to claim 1, wherein said cover portion forms a dome.

3. The dish according to claim 2, wherein said dome has a circular cross-section and said opening has a circular shape.

4. The dish according to claim 2, wherein said dome has an elliptical cross-section and said opening has an elliptical shape.

5. The dish according to claim 2, wherein said dome has a rectangular cross-section and said opening has a rectangular shape.

6. The dish according to claim 1, wherein said lid is essentially flat.

7. The dish according to claim 1, wherein said lid has a downward directed flange which is inserted into said opening.

8. The dish according to claim 1, wherein the base has ridges on an upper surface thereof to prevent water contact.

9. A method for displaying and preserving vegetables at room temperature comprising the steps of:
   providing a dish having:
      a planar base;
      a transparent cover portion having a lower edge opening disposed sealingly on said base and an opening, surrounded by an upper edge, in an upper portion of said cover portion, said opening being smaller than said lower edge opening to allow removal of vegetables placed on said planar base without removing said transparent cover from said planar base; and
      a lid closing said opening by overlapping the upper edge without providing an airtight seal so that a small amount of gas exchange occurs between the lid and the upper edge; and placing fresh vegetables at room temperature into said dish whereby the vegetables are preserved.

* * * * *